United States Patent [19]
Ward

[11] Patent Number: 5,372,160
[45] Date of Patent: Dec. 13, 1994

[54] APPARATUS FOR DIVIDING FLOWS OF VOLATILE FLUIDS SUCH AS AGRICULTURAL AMMONIA USED AS FERTILIZER

[76] Inventor: David P. Ward, 1528 Stemmons Ave., Dallas, Tex. 75208

[21] Appl. No.: 104,788

[22] Filed: Aug. 11, 1993

[51] Int. Cl.⁵ .................................................. B05B 1/14
[52] U.S. Cl. ................................. 137/561 A; 239/553; 239/590.3
[58] Field of Search .................. 137/561 A; 239/553, 239/590, 590.3

[56] References Cited

U.S. PATENT DOCUMENTS

| | | | |
|---|---|---|---|
| 2,910,136 | 10/1959 | Valliant et al. | 55/421 |
| 3,824,765 | 7/1974 | Williams | 55/421 |
| 4,284,243 | 8/1981 | Shaner | 137/561 A |
| 4,612,120 | 9/1986 | Box | 55/421 |
| 4,807,663 | 2/1989 | Jones | 137/561 A |
| 5,040,558 | 8/1991 | Hickey et al. | 137/561 A |
| 5,170,820 | 12/1992 | Jones | 137/561 A |

*Primary Examiner*—A. Michael Chambers
*Attorney, Agent, or Firm*—Daniel V. Thompson

[57] ABSTRACT

A device receives a volatile fluid, then separates the vapor phase portion from the liquid phase portion in a separation chamber, and then provides separate paths from the separation chamber to a selective outlet ring across liquid and gas orifices for each outlet in the ring, where the divided gas and liquid are recombined, thereby enhancing the equal distribution of the fluid.

7 Claims, 3 Drawing Sheets

APPARATUS FOR DIVIDING FLOWS OF VOLATILE FLUIDS SUCH AS AGRICULTURAL AMMONIA USED AS FERTILIZER

TECHNICAL FIELD

This application relates to fluid control apparatus, and more particularly to a flow dividing manifold for a liquified gas.

BACKGROUND OF THE INVENTION

In the past the agricultural ammonia industry has used a relatively small ammonia applicator mounted to the three point hitch of a tractor. The applicator was built to carry a predetermined number of applicator knives depending on the number of rows to be treated on each pass. An ammonia tank was conveniently mounted on the applicator. The ammonia was divided in a confined manifold chamber across orifices which were placed in the hose fittings that feed the knives. This manifold was part of an expansion valve that maintained a predetermined pressure depending on the quantity per acre and the tractor speed. Placed between the ammonia tank's withdrawal valve and the expansion valve was a quick opening shutoff valve which the operator used to shut down the system as he made his turns at the end of the rows.

The applicator tank was filled from a detached nurse tank by the operator. While this prior system was slow due to its small size, it was probably more consistent across the fields than today's large applicator systems. Currently used large tractors mounted with relatively large tool bars, with a nurse tank in tow, have the capability of covering large tracts of land rather rapidly. Accurate ground speed control of these tractors has made it easier to lay down a given amount of ammonia for a given area, and radar ground speed sensors have removed the error of wheel slippage. With electronic controls, we are sure of the overall quantity of ammonia a given field has received, but still no one is quite sure of where it is in the field due to the variables in the art of distribution across the tool bar.

Distribution manifolds in use prior to my invention were predominantly simple devices having a central inlet opening into a disc shaped chamber, with the hose connector outlets installed in pipe threads that open into the chamber about the periphery. In use, there were typically openings that were not required and that were plugged. The larger grains, such as corn and milo, require fewer applicator knives per tool bar width than the smaller grains like wheat and barley. A forty-five foot tool bar would be a thirteen row machine in corn, requiring a manifold with thirteen outlets with equal lengths of applicator hoses, for example, thirteen hoses of twenty-five feet in length. The same tool bar rigged for small grains could have as many as forty-five knives with forty-five hoses, each twenty-five feet in length, and the user would be applying one third the product through three and one half times as many hoses.

The number and length of hoses is important, because the two forces acting on the distribution of ammonia through a manifold and hoses are gravity and thermal energy. A compact manifold having a reasonably high pressure difference across it on level ground could have its distribution noticeably affected from an uneven heat flow into the applicator hoses, because a liquified gas like ammonia prefers to flow away from heat to a colder area. To date, there has been little fruitful work done to solve the variables in distribution.

SUMMARY OF THE INVENTION

The invention described herein enables the use of relatively small but efficient manifolds mounted on the tool bar, each manifold having a number of outlets matching the number of knives that it feeds. These manifolds can be used with applicators that are still in use today by simply providing manifold rings with the proper number of outlets. The tool bar mounted manifolds will receive ammonia from either a meter having a combination throttle flow divider or a master flow divider, utilizing manifolds having the proper number of outlets to feed the manifolds.

An object of this invention is to receive agricultural ammonia whose quantity is predetermined and controlled to provide the proper overall quantity to the field overall, and divide this quantity of ammonia across swaths determined by the length of the tool bar into streams of equal quantity determined by the row widths. The success of this invention will be determined by the overall crop performance, which begins at the journey's end of the ammonia, the applicator knives.

The total agricultural ammonia application system can be expressed as resistances in series beginning with the dip tube of the nurse tank and ending with the ammonia discharge of the knife. The resistance of the knives' discharge ports is the last in the series and is at times erratic. For this reason our explanation will begin there. Each knife is fed from a manifold having an outlet ring with the proper number of outlets to provide product to the knives for which it is responsible. Hose fittings are provided for each outlet of the ring with hoses feeding each knife. A resistance is placed in these hose fittings, so we isolate two resistances in series. Should the resistance of the hose fitting be seven times the resistance of the knife outlets, the knife outlets would offer but one percent of the total resistance. There are small outlet chambers in the outlet ring just upstream from the hose fittings, each of which is entered by two orifices, one of which is a liquid orifice, the other is a gas orifice. One must understand at this point that this invention has no control over the overall quantity of ammonia moving, but instead receives the ammonia in whatever condition is required by the throttling device to satisfy the reading device of the meter. The lower the demand, the more vapor and the lower the system pressure of the product received by this system; however, this system contains only fixed area points of resistance and will therefore be proportional to the overall system resistance. The pressure difference across the gas orifice will equal the pressure difference across the liquid orifice minus the liquid head, which is limited to about 1.8 inches of head, and will therefore have virtually no effect on the liquid/vapor proportion.

The manifold is preferably mounted horizontally on the tool bar and receives ammonia through a rather large feeder hose which encourages separation of the liquid from the vapor by gravity. Liquid and vapor remain separated as the ammonia enters the manifold main body through an inlet passageway. The inlet passageway is so positioned in relation to a circular radius separation surface formed in the main body to accelerate the ammonia inward as it flows in a circular path in a separation chamber. This inward acceleration keeps the liquid outward while gravity forces it downward into a vertical liquid passageway, where it is accelerated as it moves downward and crosses a vertical dam, where it reaches its maximum downward velocity and decreases with the downward movement due to the increased cross section area which increases as the outer diameter increases. The liquid is then again accelerated across the liquid orifice into an outlet, where it joins with the vapor moving across the gas orifice. The vapor leaves the liquid at the upward center of the separation chamber of the main body and the upper gas passageway before moving over the top of an interliner and then moving downward through a group of inner gas passageways. The inner gas passageways move the vapor and traces of liquid to a lower gas passageway formed by a groove in the lower portion of the interliner before moving radially outward to the gas orifices.

Upstream from the described manifold is a master flow divider which is an enlarged version of the manifold but has outlet rings of either three or four outlets which have equal outlet ports or tailored outlet ports depending on the number of outlets on the manifolds. There are times that the required rows cannot be divided by three or four so the ports feeding the odd manifold would be sized based on the number of ports.

Another objective of this invention is to provide the means to put down the ammonia evenly across the swath of the tool bar even in rolling hills. This invention provides the opportunity to economically tailor the hardware to fit the equipment's ability to perform. The nurse tank and required hardware from the nurse tank to the tool bar, in typical ambient temperatures, are the factors that limit top end performance. It makes good sense to use most of the available system pressure across the flow divider ports to aid the distribution of ammonia to the manifolds, rather than try to satisfy some specific condition that has very limited use and require that under certain ambient conditions a reduction in speed is required for acceptable results.

Yet another objective of this invention is to reduce the large bundle of seemingly unnecessary applicator hose that is coiled on the tool bar used for the small grains. The large bundle of hoses is necessary but very distasteful to the practically-minded farmer. As mentioned above, to provide a more uniform distribution across the tool bar, applicator hoses of equal length have been found to be the most effective means; however, these extra lengths of hose for all but the furthest-placed knives must be bundled to keep them out of the way. Invariably the hose that fails first is the one buried the deepest inside the bundle. The hose lengths for the tool bar manifolds will probably still be of equal lengths but much shorter, 8-9 feet compared to 25 feet, which will eliminate the bundles as well as improve distribution by limiting the thermal energy flow into the system.

The path of agricultural ammonia begins at the meter, where the total quantity of product is controlled (based on the pounds N per acre, the swath width and the tractor speed). As the ammonia leaves the meter it passes through a flow divider, when more than one manifold is used, or directly to the manifold when only one manifold is used.

DETAILED DESCRIPTION OF THE INVENTION

Figure 1:
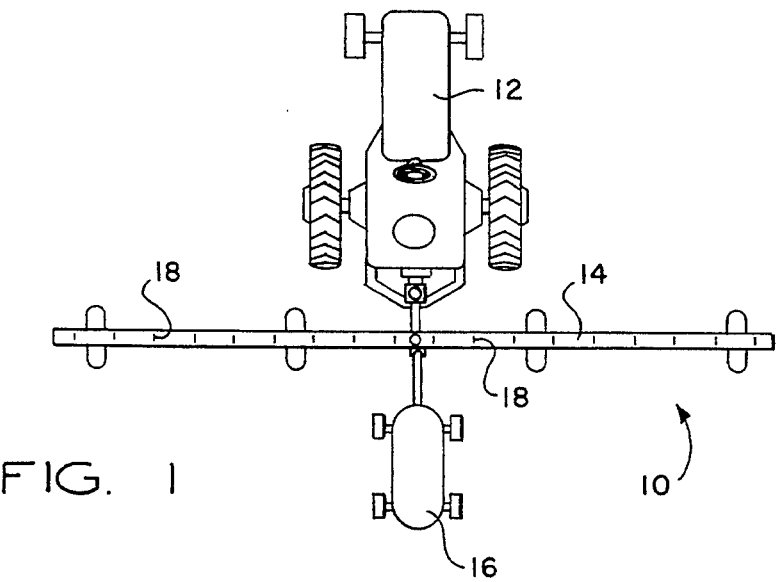
FIG. 1 is a schematic overhead view of an ammonia application system incorporating the invention.

In the description which follows, like parts are marked throughout the specification and drawings with the same respective reference numerals. The drawings are not necessarily to scale and in some instances proportions may have been exaggerated in order to more clearly depict certain features of the invention.

Figure 2:
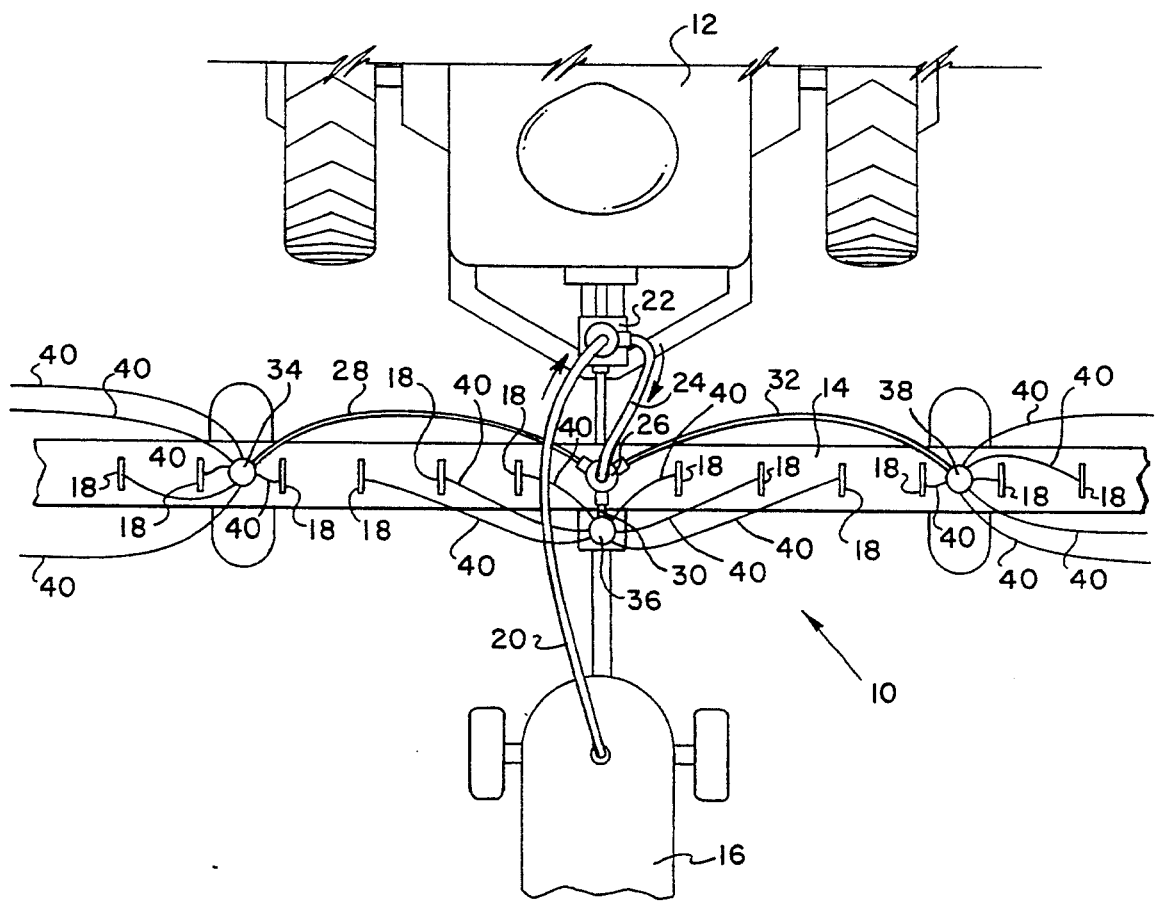
FIG. 2 is an enlarged view of a portion of the system of FIG. 1.

Referring initially to FIGS. 1 and 2, ammonia system 10 includes a tractor 12 pulling a tool bar 14, which in turn pulls a nurse tank 16. In conventional fashion, tool bar 14 includes a plurality of applicator knives 18 depending downwardly from the tool bar into the soil. Hose 20 extends from the nurse tank 16 to a meter 22. Hose 24 extends from the meter to a flow divider 26. Hoses 28, 30 and 32 extend from flow divider 26 to manifolds 34, and 38, respectively, and an individual line 40 extends from one of the manifolds 34, 36, 38 manifold to each knife 18.

Figure 3:
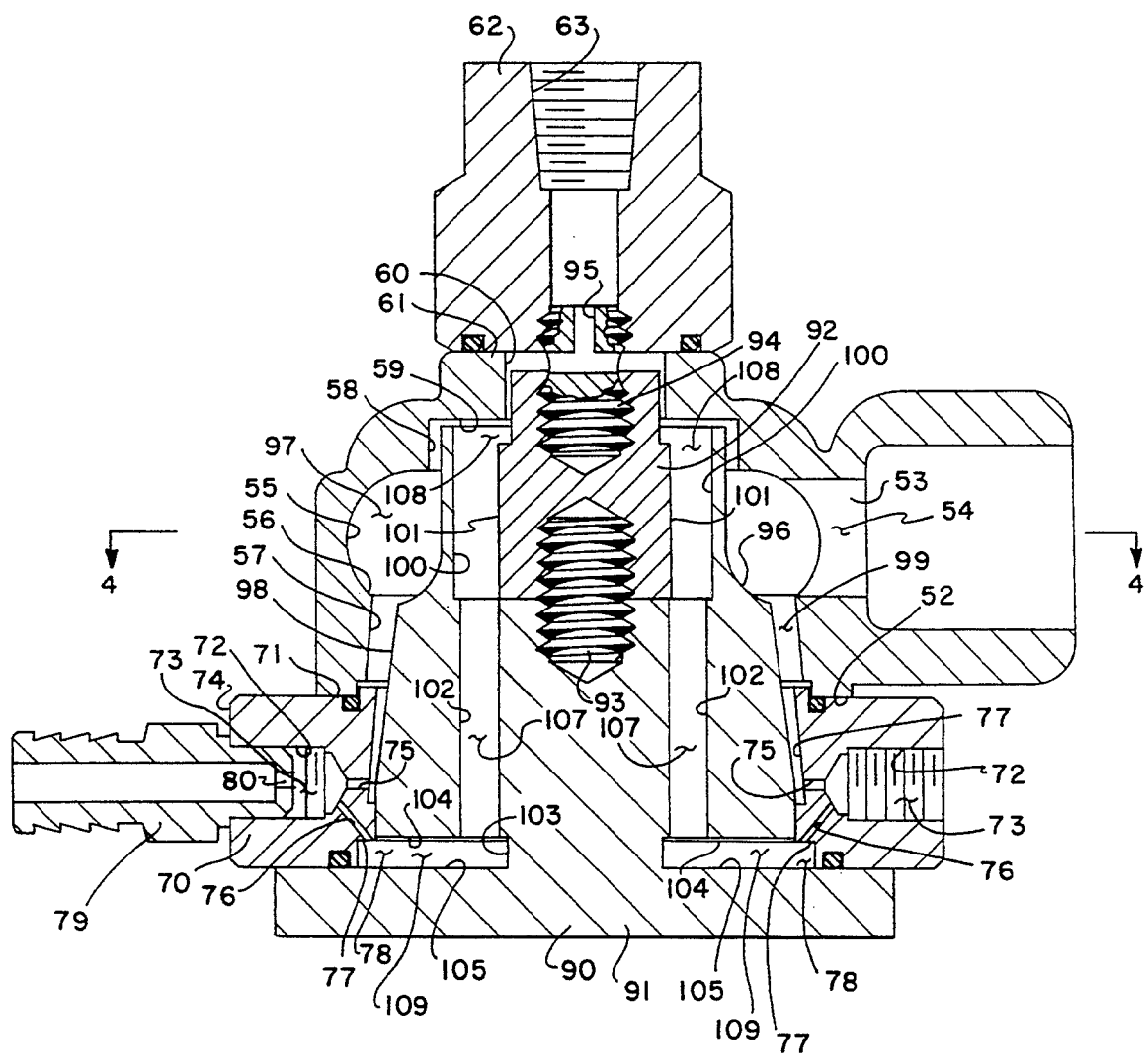
FIG. 3 is a partially broken-away side view of a manifold of the present invention.
Figure 4:
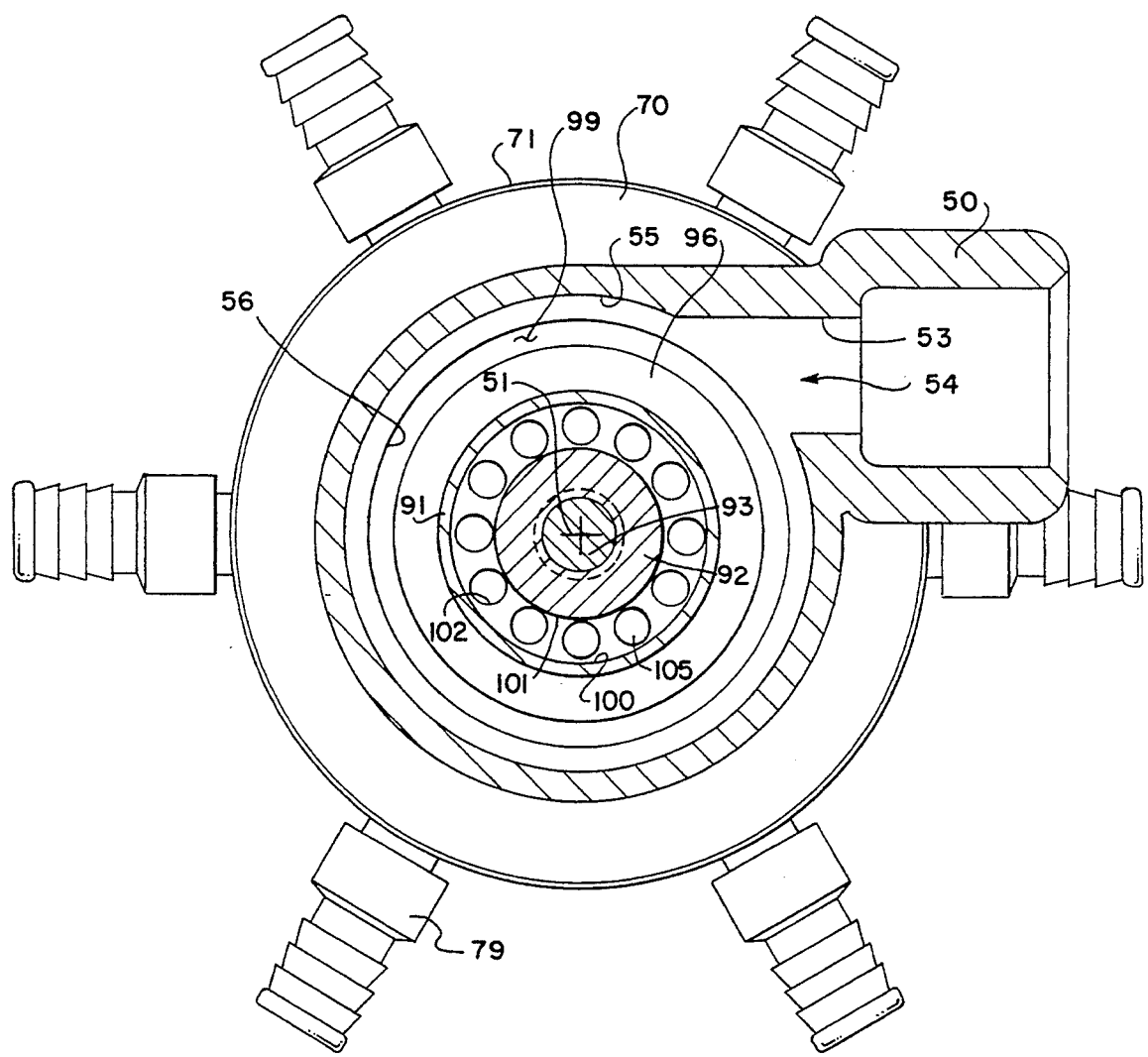
FIG. 4 is a section view taken along lines 4—4 of FIG. 3.

Referring now to FIGS. 3 and 4, manifold 36 is typical to manifolds 34, 36, 38 illustrated in FIG. 2. In addition, the illustrated manifold 26 is typical, with minor changes, to flow divider 26 illustrated in FIG. 2.

Manifold 36 includes a main body 50 having a vertical central axis 51 and an open bottom 52. Walls 53 define an offset inlet passageway 54 tangentially disposed in relation to a separation surface 55. Separation surface 55 is inwardly concave and has circular cross sections about main axis 51. Separation surface 55 terminates at its lower portion at a sharp dam edge 56. Dam edge 56 is circular about the main axis 51 and horizontal, and dam edge 56 is spaced more closely to main axis 51 than the separation surface 55.

Main body 50 further includes a generally vertically cylindrical upper outer liquid passageway surface 57 extending downwardly from dam edge 56. In addition, main body 50 has a generally vertically cylindrical outer gas passageway surface 58 extending upwardly from separation surface 55 and terminating at a horizontally planar upper gas passageway surface 59. In the preferred embodiment, main body 50 has walls 60 defining an opening in its top surface 61, with a retaining plug 62 sealingly engaged thereto in order to provide an opening 63 for a pressure gage (not shown).

An annular outlet ring 70 is sealingly disposed at a top surface 71 to the open bottom 52 of main body 50. Outlet walls 72 define a plurality of radial outlets 73 disposed about the outer perimeter 74 of outlet ring 70. A plurality of liquid orifice walls 75 and gas outlet walls 76 define a plurality of liquid and gas orifices, respectively, with one each of said liquid and gas orifices communicating with each of the outlets 73.

The liquid orifices extend horizontally radially inward to a generally vertically cylindrical lower outer liquid passageway surface 77 extending upwardly to upper outer liquid passageway surface 57. The gas orifices, on the other hand, extend downwardly radially inward to walls 77 forming a lower gas passageway 78. Each outlet 73 is fitted with a hose barb 79 specially adapted to include an isolating orifice 80.

An interliner member 90 can be formed of a single component, but in the preferred embodiment includes lower interliner member 91 and upper interliner member 92 joined by a stud 93. Retaining plug 62 is joined to upper interliner member 92 by way of a vented stud 94. Vented stud 94 includes walls 95 establishing a passageway between upper gas passageway surface 62 and opening 63. Interliner member 90 has an outwardly concave surface 96 opposite separation surface 55 to form a separation chamber 97 therewith. Inner liquid passageway surface 98 extends downwardly from surface 96 opposite upper and lower outer liquid passageway surfaces 57, 77 to form a liquid passageway 99 depending from separation chamber 97. Internal walls 100, 101, 102, 103, 104, 105 form inner gas passageways 107 communicating at upper ends 108 with upper gas passageway surface 59 and at lower ends 109 with the lower gas passageway 78.

In operation, flexible hoses 40 are run from the outlets 73 to the knives 18 which are mounted on the tool bar 14 providing an open ended system. As expanded ammonia enters inlet passageway 54, the pressure will be from about 15 to 60 PSIG or higher on extremely warm days and heavy applications. The product's temperature will reflect its dew point at the manifold pressure, while its density will be a fluctuation of the difference in dew points or temperatures between the tank and the manifold. The greater the difference the less dense the product, therefore, the lighter the product the higher the velocity. Also, that product in its liquid phase will always contain the majority of the mass, while the product in its gas phase will always demand more volume. To separate the vapor from the liquid, the liquid is continually accelerated inward by confining it to a circular path.

Manifold 36 provides the short main body 50 with a vertical, cylindrical opening through its center, and has a reduced diameter at its top end which receives retaining plug 62 that pulls up tubular cylindrical interliner member 90 having a reduced diameter at the upper end and a flange at the lower end. Sandwiched between the upper face of this flange and the lower face of the main body 50 is the manifold outlet ring 70. Ring 70 has the proper number of outlets 73 with each outlet having sized liquid and gas orifices communicating to both the liquid side and the vapor side of the separation chamber formed by concave surfaces 55 and 99. The tubular interliner has inner gas passageways 107 to provide the vapor path from the separation chamber to the outlet ring. Surfaces 57, 77, 98 form a controlled restriction of the liquid path. The manifold inlet passageway 54 enters the separation chamber through a controlled path that starts to accelerate the ammonia to the center of the manifold as it assumes its circular path around the separation surface 55, which accelerates the ammonia inward increasing the weight of the ammonia. The liquid ammonia, having the greater density, resists the inward acceleration forcing the lighter vapor inward and upward through passageways 107 to the lower portion of the outlet ring 70, where it moves through the controlled gas orifices to the outlets 73, while the heavier liquid flows outward and downward, where it meets the liquid sized orifices in the outlet ring. Liquid moves into the center of the outlet 73 opening and is recombined with the vapor from orifices 76 slightly downstream of the liquid. It can thus be seen that a device is provided which first separates the vapor from the liquid and then divides each of them separately before they enter and are recombined at the outlets on the way to the knives.

The sizing of the parts of the manifold are related to row crops or broadcast crops, and while the manifolds may require different numbers of outlets, the port sizing is constant with either row crop or broadcast. Example 1: for a thicker row tool bar with three manifolds, two of the manifolds have four outlets, and the third manifold has five outlets, all with the same porting. The master flow divider has two equal ports for the four-outlet manifolds and a third port for the five-outlet manifold enlarged by a factor of the different number of outlets in the manifold, 5/4 or ¼ larger. Example 2: two manifolds, one with six outlets and one with seven outlets, with two master divider ports, one larger by 7/6 or 1.1667 larger. The difference is related to the length of the feed hoses. With the three manifolds the hoses would be about nine feet, while with two manifolds the feed hoses would be about thirteen feet. Example 3: A forty-five foot bar setup for small grain having four manifolds would require three manifolds with eleven outlets, one manifold with twelve outlets, and feed hoses of about eight feet. The master flow divider would have three equal ports with one enlarged by 12/11 or 9.09%.

What is claimed is:

1. An apparatus for dividing flows of volatile fluid made up of mixed liquid and gaseous phase components, comprising:

a main body having an inlet;

separating means downstream of the inlet for separating the liquid and gaseous phase components;

first dividing means downstream of the separating means for equally dividing the separated liquid components;

second dividing means downstream of the separating means for equally dividing the separated gaseous components;

recombining means downstream of the first and second dividing means for recombining the divided liquid and gaseous components; and the main body having a plurality of outlets downstream of the recombining means.

2. The apparatus of claim 1 with the main body having a vertical central axis and the separating means comprising walls defining an offset inlet passageway tangentially disposed in relation to a separation chamber formed by a curved separation surface.

3. The apparatus of claim 2 with the separation surface being inwardly concave and having circular horizontal cross sections about the main axis.

4. The apparatus of claim 2 with the separating means further comprising liquid passageway surfaces extending downwardly from the separation chamber, and having gas passageway surfaces extending upwardly and inwardly from the separation chamber.

5. The apparatus of claim 1 with the recombining means comprising outlet walls defining a plurality of outlets, and the first and second dividing means comprising orifice walls defining a plurality of liquid and gas orifices, respectively, one each of the liquid and gas orifices communicating with each of the outlets.

6. An apparatus for dividing flows of volatile fluid made up of mixed liquid and gaseous phase components, comprising:

a main body having an inlet;

separating means downstream of the inlet for separating the liquid and gaseous phase components;

first dividing means downstream of the separating means for equally dividing the separated liquid components;

second dividing means downstream of the separating means for equally dividing the separated gaseous components;

recombining means downstream of the first and second dividing means for recombining the divided liquid and gaseous components;

the main body having a plurality of outlets downstream of the recombining means;

with the main body having a vertical central axis and the separating means comprising walls defining an offset inlet passageway tangentially disposed in relation to a separation chamber formed by a curved separation surface; and with the separation surface terminating at its lower portion at a sharp dam edge, the dam edge being circular about the main axis and horizontal, and with the dam edge being spaced more closely to the main axis than the separation surface.

7. An apparatus for dividing flows of volatile fluid made up of mixed liquid and gaseous phase components, comprising:

a main body having a vertical central axis, an open bottom, and walls defining an offset inlet passageway tangentially disposed in relation to a separation surface;

the separation surface being inwardly concave and having circular horizontal cross sections about the main axis, with the separation surface terminating at its lower portion at a sharp dam edge, the dam edge being circular about the main axis and horizontal, and with the dam edge being spaced more closely to the main axis than the separation surface;

an annular outlet ring sealingly disposed at a top surface to the open bottom of the main body, with outlet walls defining a plurality of radial outlets disposed about the outer perimeter of the outlet ring, and orifice walls defining a plurality of liquid and gas orifices, one each of the liquid and gas orifices communicating with each of the outlets;

the liquid orifices extending horizontally radially inward to a generally vertically cylindrical lower outer liquid passageway surface extending upwardly to the upper outer liquid passageway surface;

the gas orifices extending downwardly radially inward to walls forming a lower gas passageway; and an interliner member having an outwardly concave surface opposite the separation surface to form a separation chamber therewith, with an inner liquid passageway surface extending downwardly from the outwardly concave surface opposite the upper and lower outer liquid passageway surfaces to form a liquid passageway depending from the separation chamber, and with internal walls forming inner gas passageways communicating at upper ends with the upper gas passageway surface and at lower ends with the lower gas passageway.

* * * * *